United States Patent
Akamatsu

(10) Patent No.: US 11,159,710 B2
(45) Date of Patent: Oct. 26, 2021

(54) LOWPASS FILTER CONTROL APPARATUS, LOWPASS FILTER CONTROL METHOD, AND IMAGING APPARATUS

(71) Applicant: SONY CORPORATION, Tokyo (JP)

(72) Inventor: Norihiko Akamatsu, Tokyo (JP)

(73) Assignee: SONY CORPORATION, Tokyo (JP)

(*) Notice: Subject to any disclaimer, the term of this patent is extended or adjusted under 35 U.S.C. 154(b) by 522 days.

(21) Appl. No.: 16/074,223

(22) PCT Filed: Jan. 19, 2017

(86) PCT No.: PCT/JP2017/001692
§ 371 (c)(1),
(2) Date: Jul. 31, 2018

(87) PCT Pub. No.: WO2017/154366
PCT Pub. Date: Sep. 14, 2017

(65) Prior Publication Data
US 2021/0144291 A1    May 13, 2021

(30) Foreign Application Priority Data
Mar. 11, 2016   (JP) .............................. JP2016-048401

(51) Int. Cl.
H04N 5/232    (2006.01)
H04N 5/235    (2006.01)

(52) U.S. Cl.
CPC ....... H04N 5/23212 (2013.01); H04N 5/2355 (2013.01)

(58) Field of Classification Search
CPC .......................... H04N 5/23212; H04N 5/2355
See application file for complete search history.

(56) References Cited

U.S. PATENT DOCUMENTS

| | | | |
|---|---|---|---|
| 5,233,431 A | 8/1993 | Yoshida et al. | |
| 6,363,220 B1 | 3/2002 | Ide | |
| 2010/0182671 A1* | 7/2010 | Park | G03B 9/08 359/245 |
| 2010/0302433 A1* | 12/2010 | Egawa | H04N 5/3696 348/345 |
| 2012/0033115 A1* | 2/2012 | Fujii | H04N 5/23212 348/280 |
| 2017/0139308 A1* | 5/2017 | Minakuti | H04N 5/23229 |
| 2017/0163864 A1* | 6/2017 | Minakuti | H04N 5/238 |

FOREIGN PATENT DOCUMENTS

| | | |
|---|---|---|
| JP | 5-48951 A | 2/1993 |
| JP | 2000-266988 A | 9/2000 |
| JP | 2005-91456 A | 4/2005 |
| JP | 2005-92085 A | 4/2005 |

OTHER PUBLICATIONS

International Search Report and Written Opinion of PCT Application No. PCT/JP2017/001692, dated Apr. 11, 2017, 09 pages of ISRWO.

* cited by examiner

*Primary Examiner* — Gevell V Selby
(74) *Attorney, Agent, or Firm* — Chip Law Group

(57) ABSTRACT

A lowpass filter control apparatus of the present disclosure includes a lowpass filter controller that causes lowpass characteristics of a variable lowpass filter disposed in an optical path of incoming light into an imaging element including phase-difference pixels and normal pixels to be different for an exposure period of the normal pixels and an exposure period of the phase-difference pixels.

15 Claims, 11 Drawing Sheets

[ FIG. 1 ]
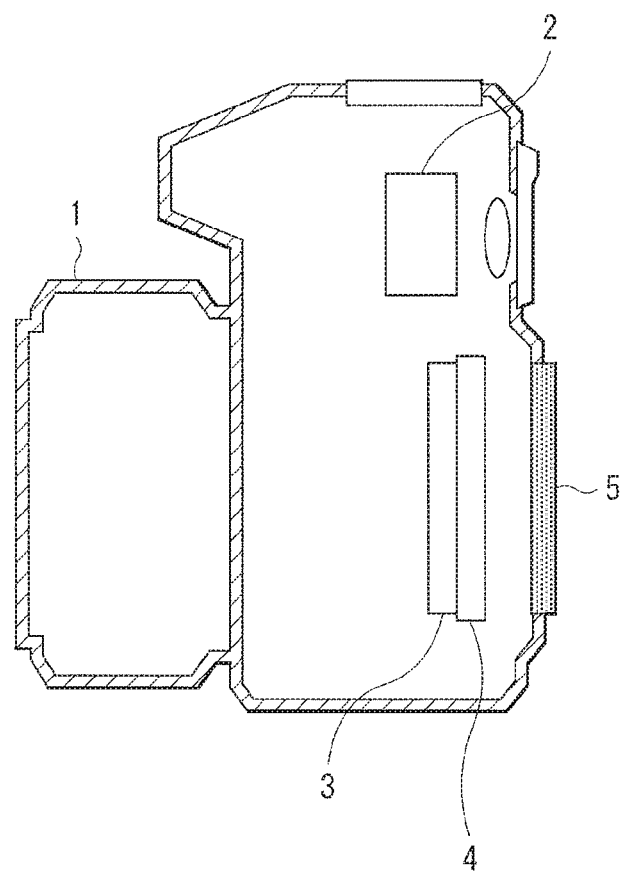

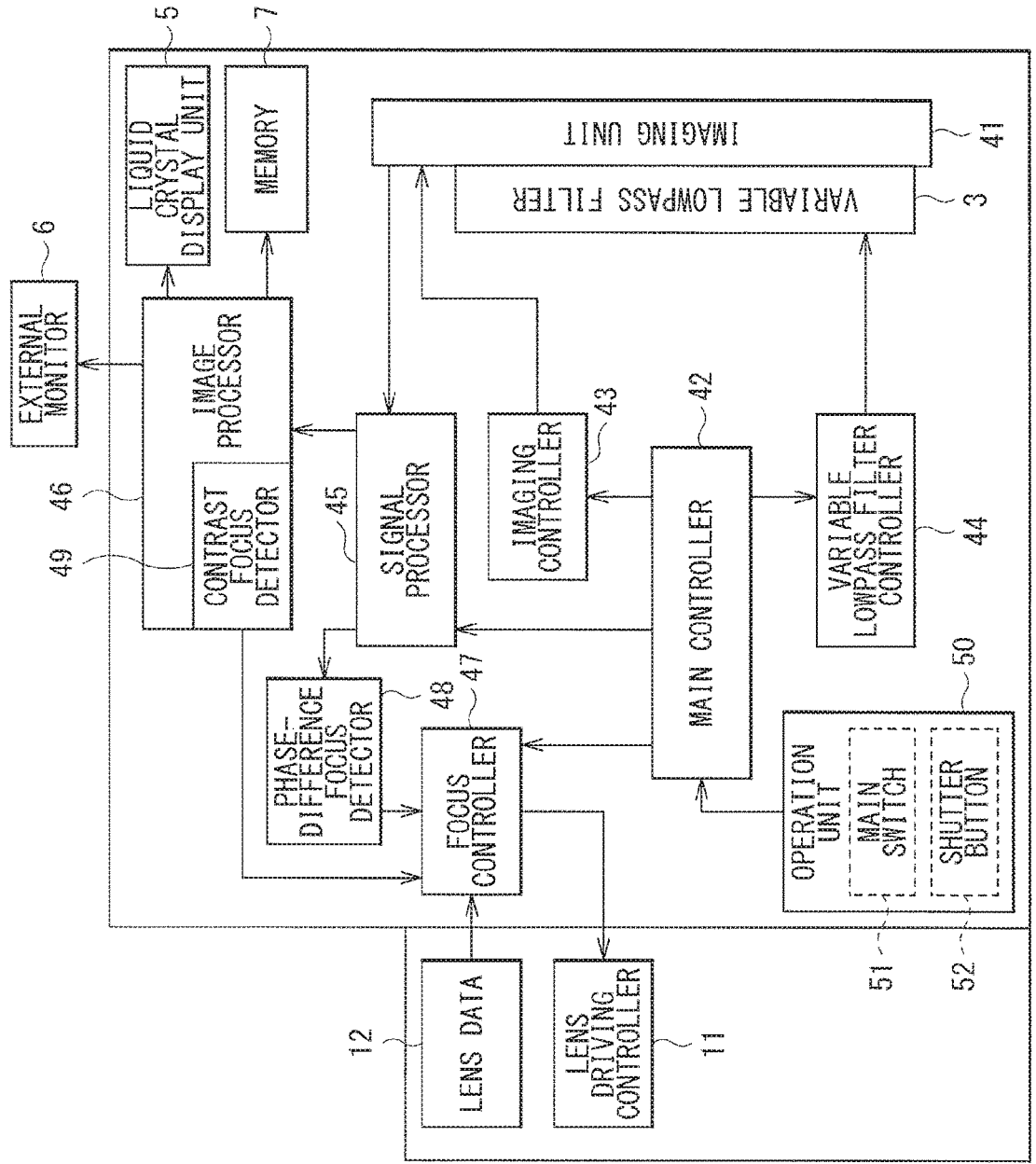
[FIG. 2]

[FIG. 3]
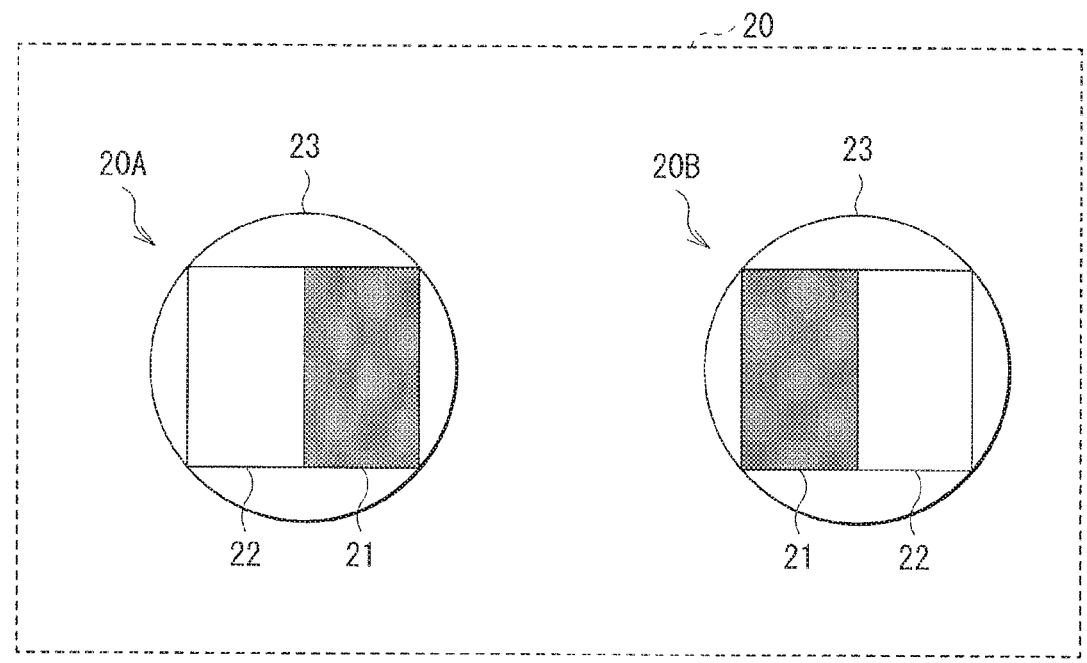
[FIG. 4]
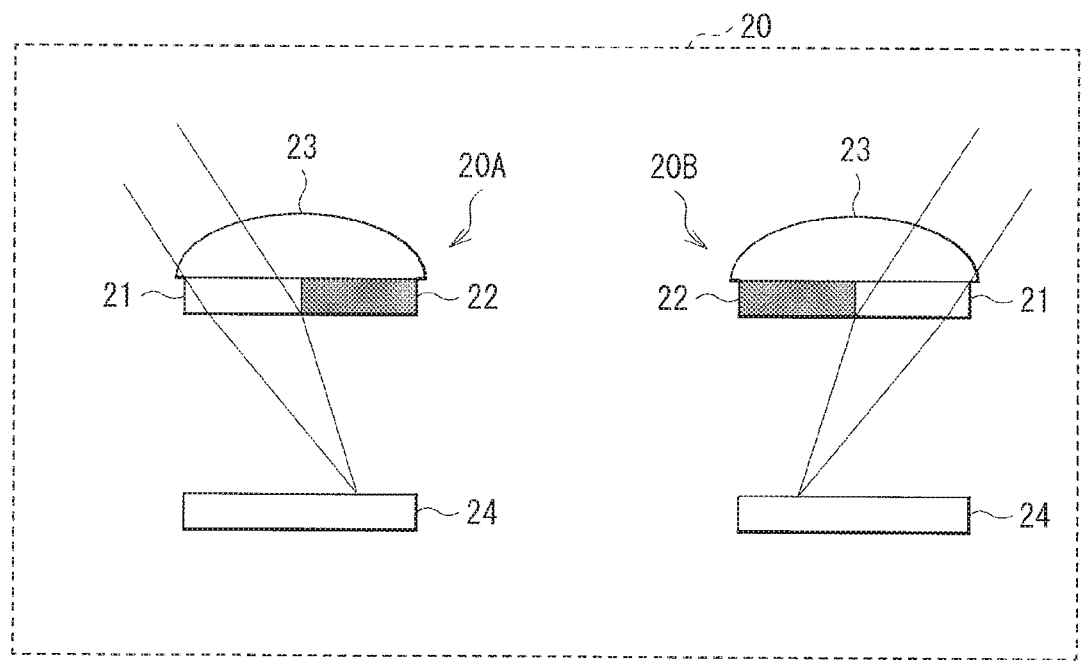

[FIG. 5]
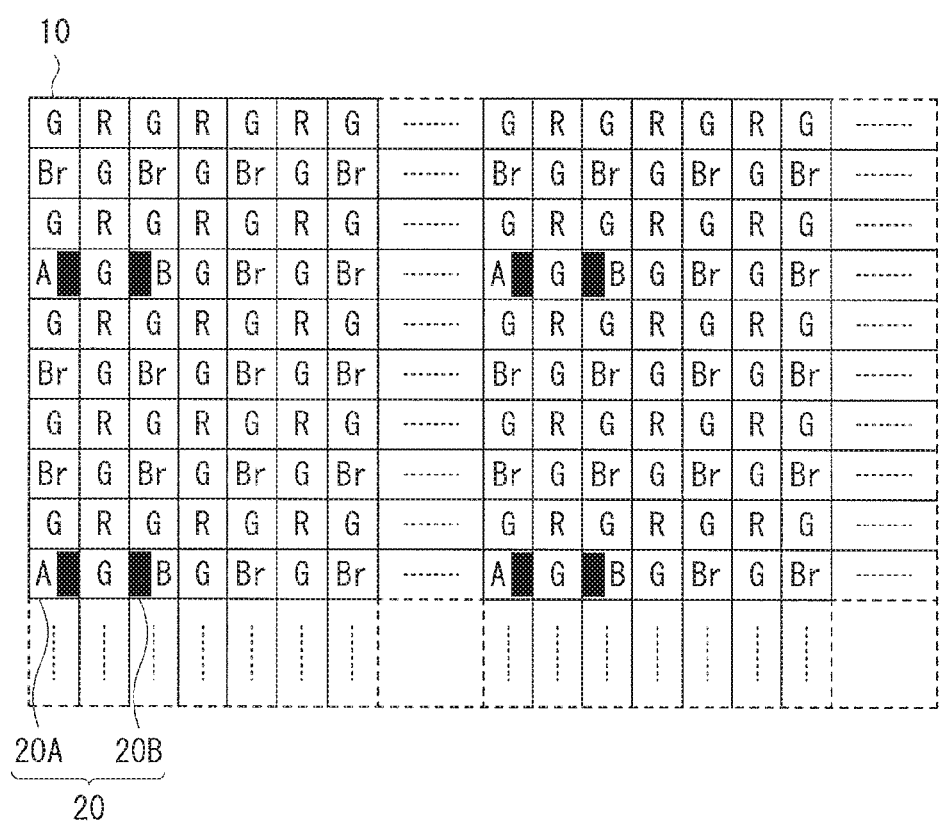

[FIG. 6]
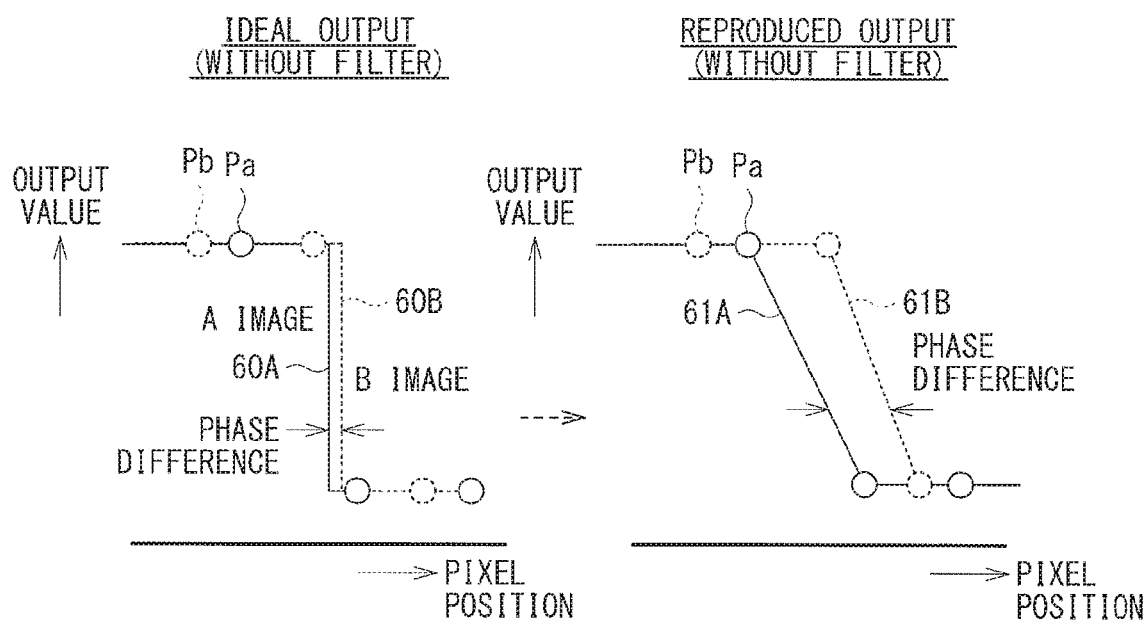
[FIG. 7]
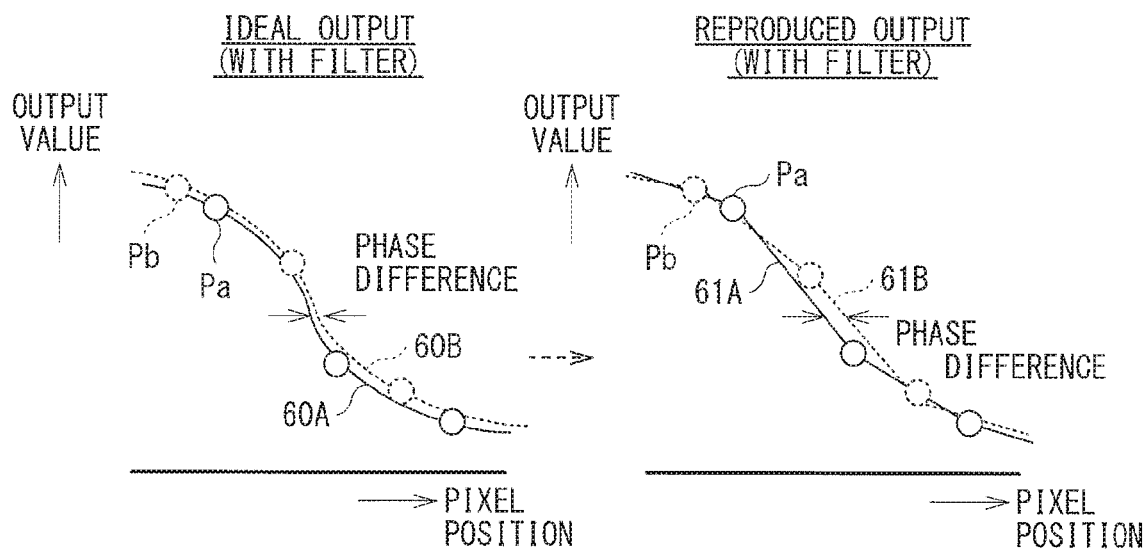

[FIG. 8]
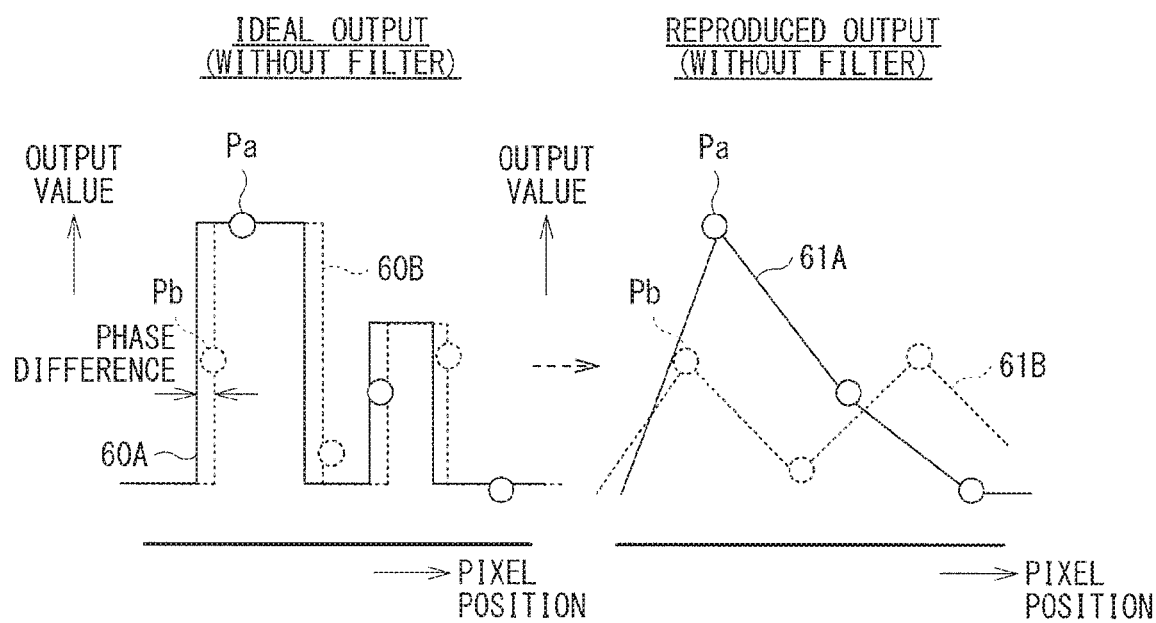
[FIG. 9]
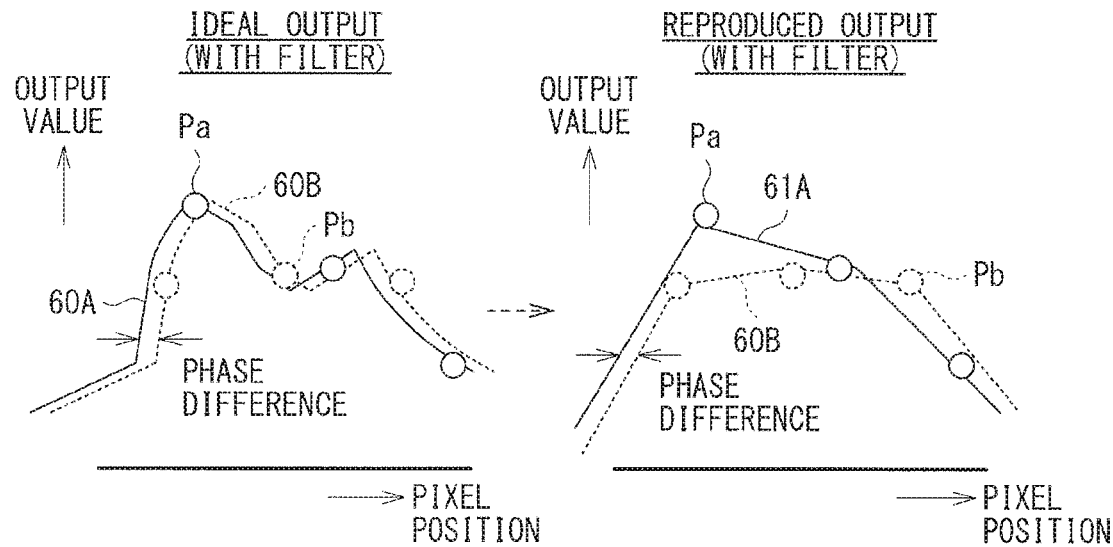

[FIG. 10]
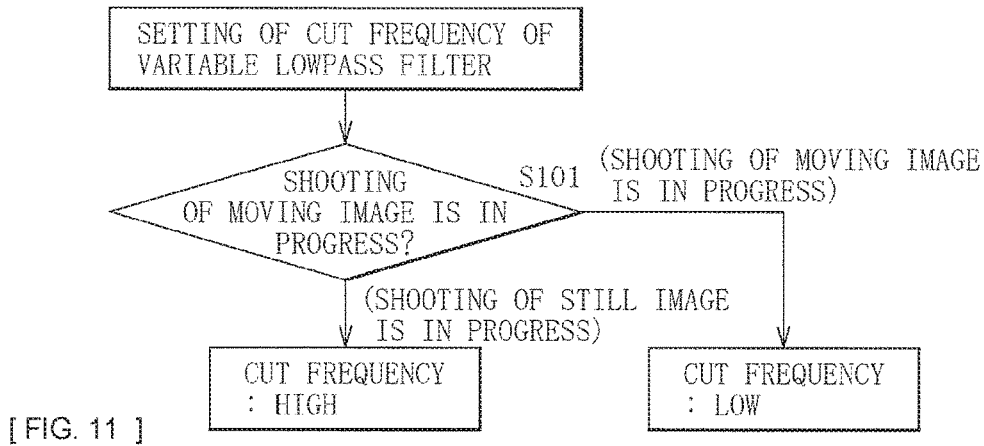
[FIG. 11]
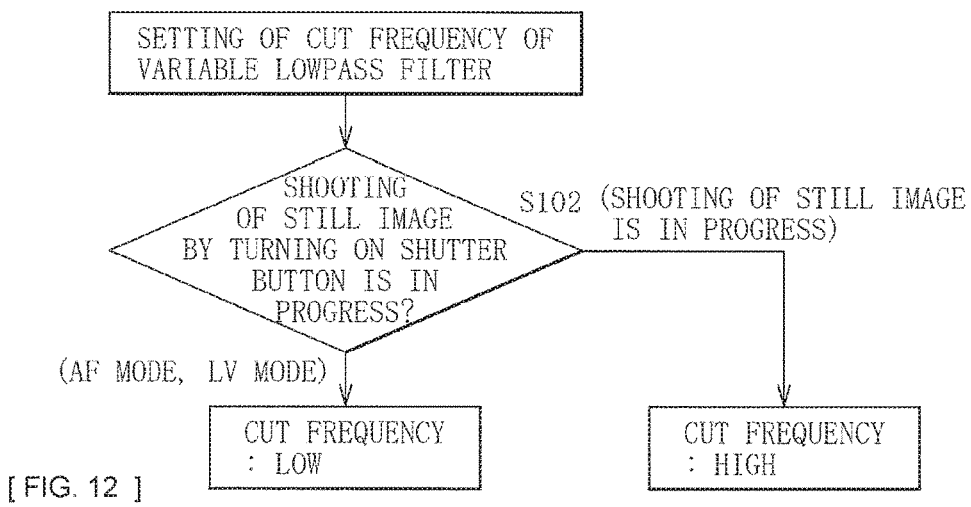
[FIG. 12]
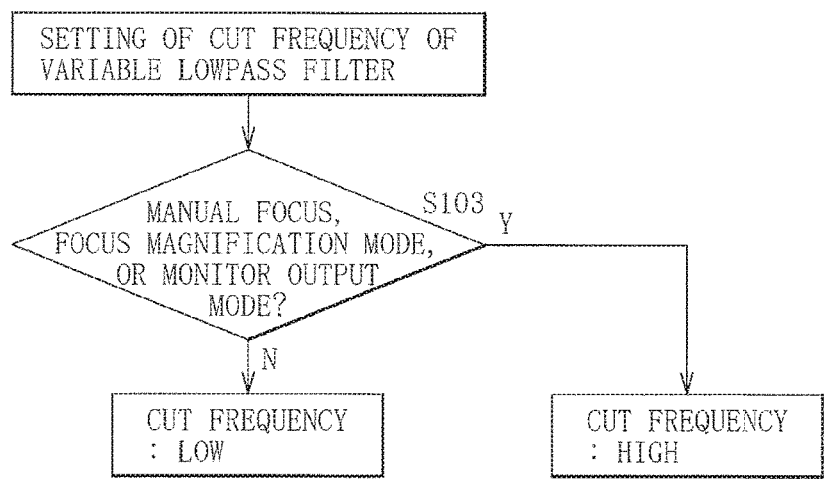

[ FIG. 13 ]
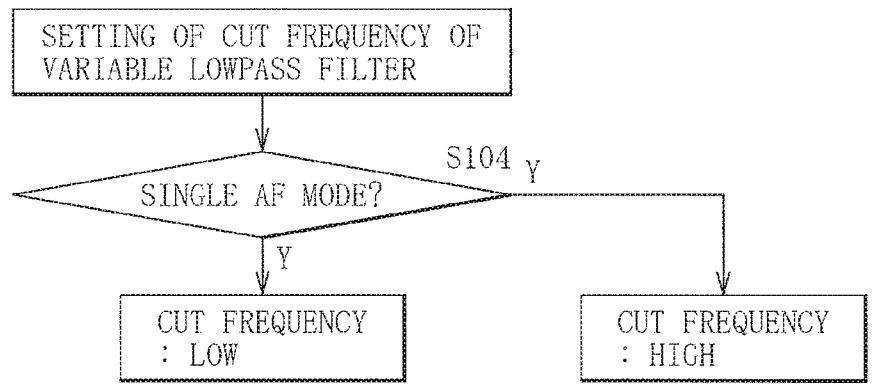
[ FIG. 14 ]
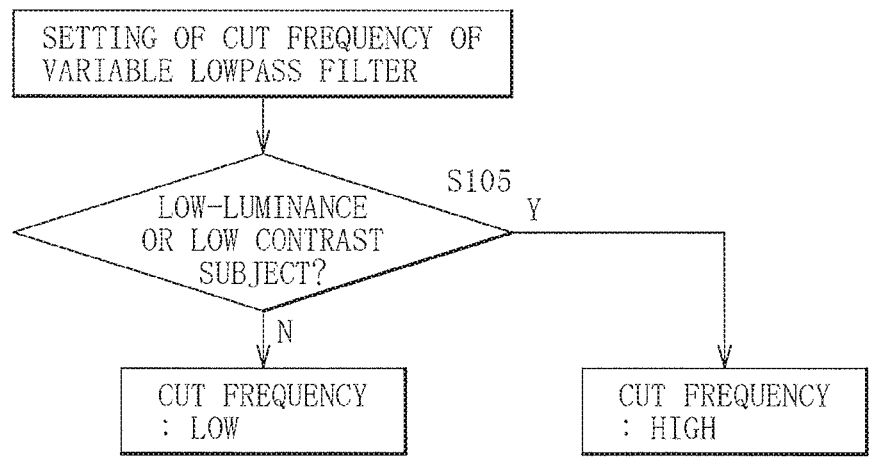
[ FIG. 15 ]
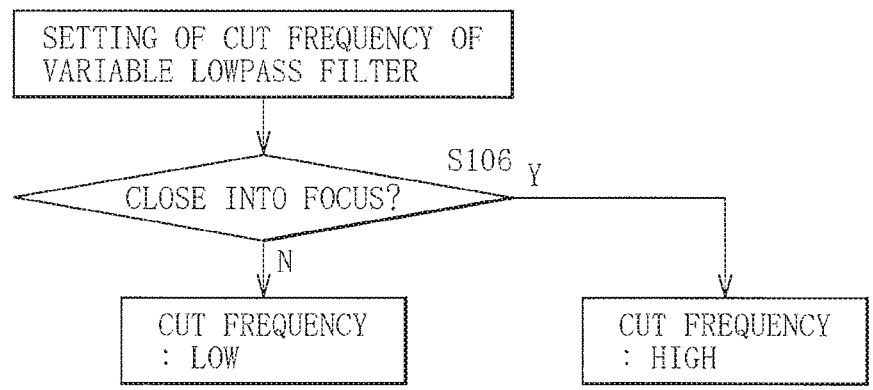

[FIG. 16]
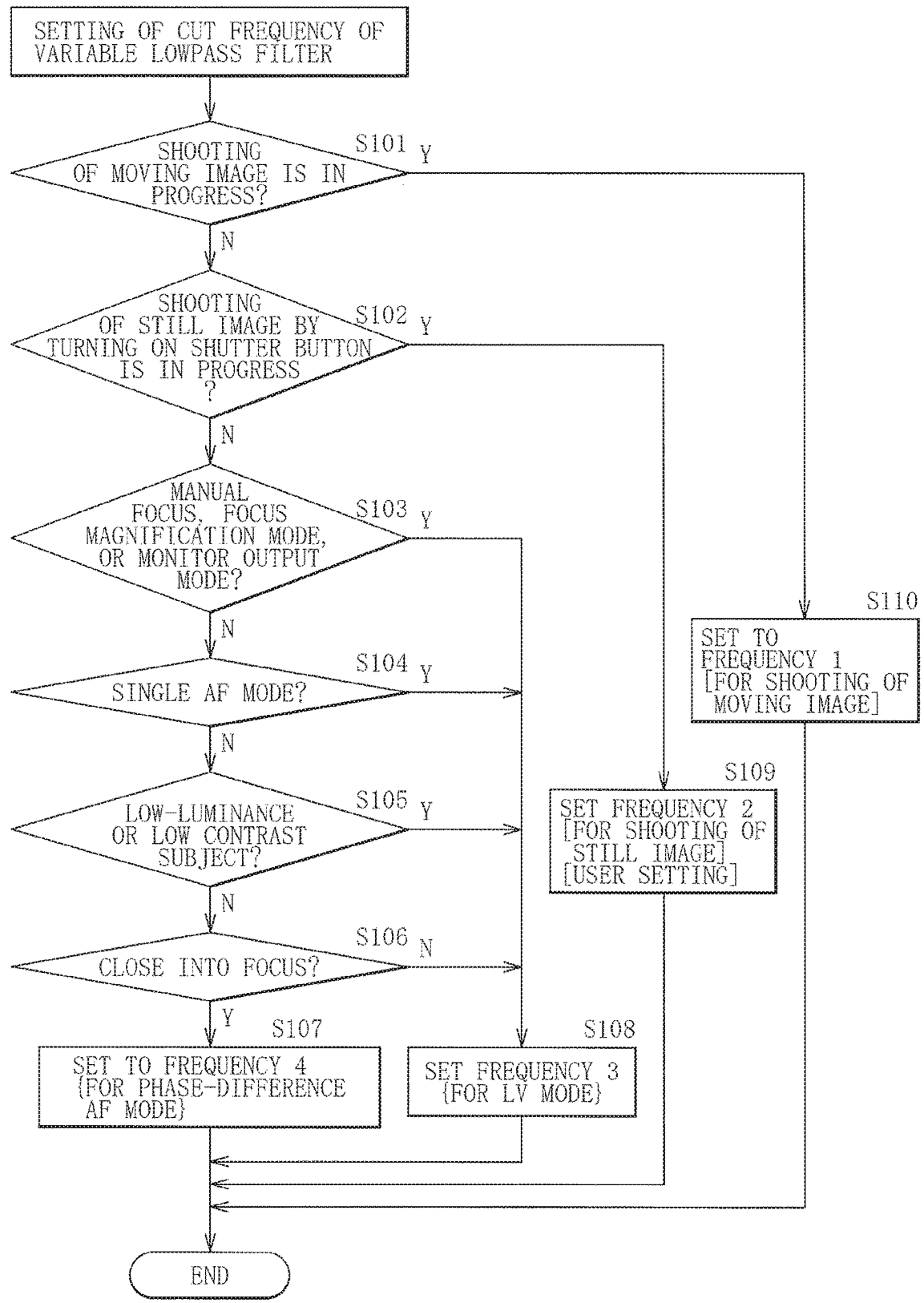

[FIG. 17]
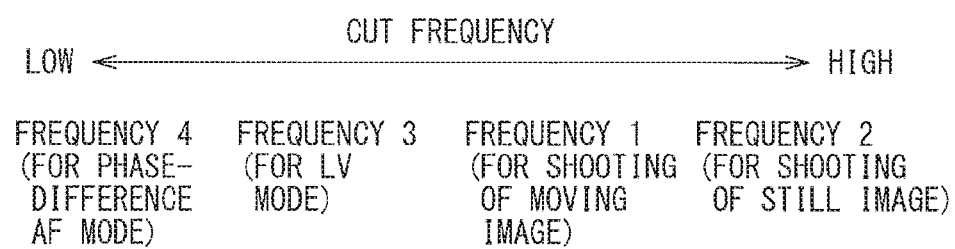

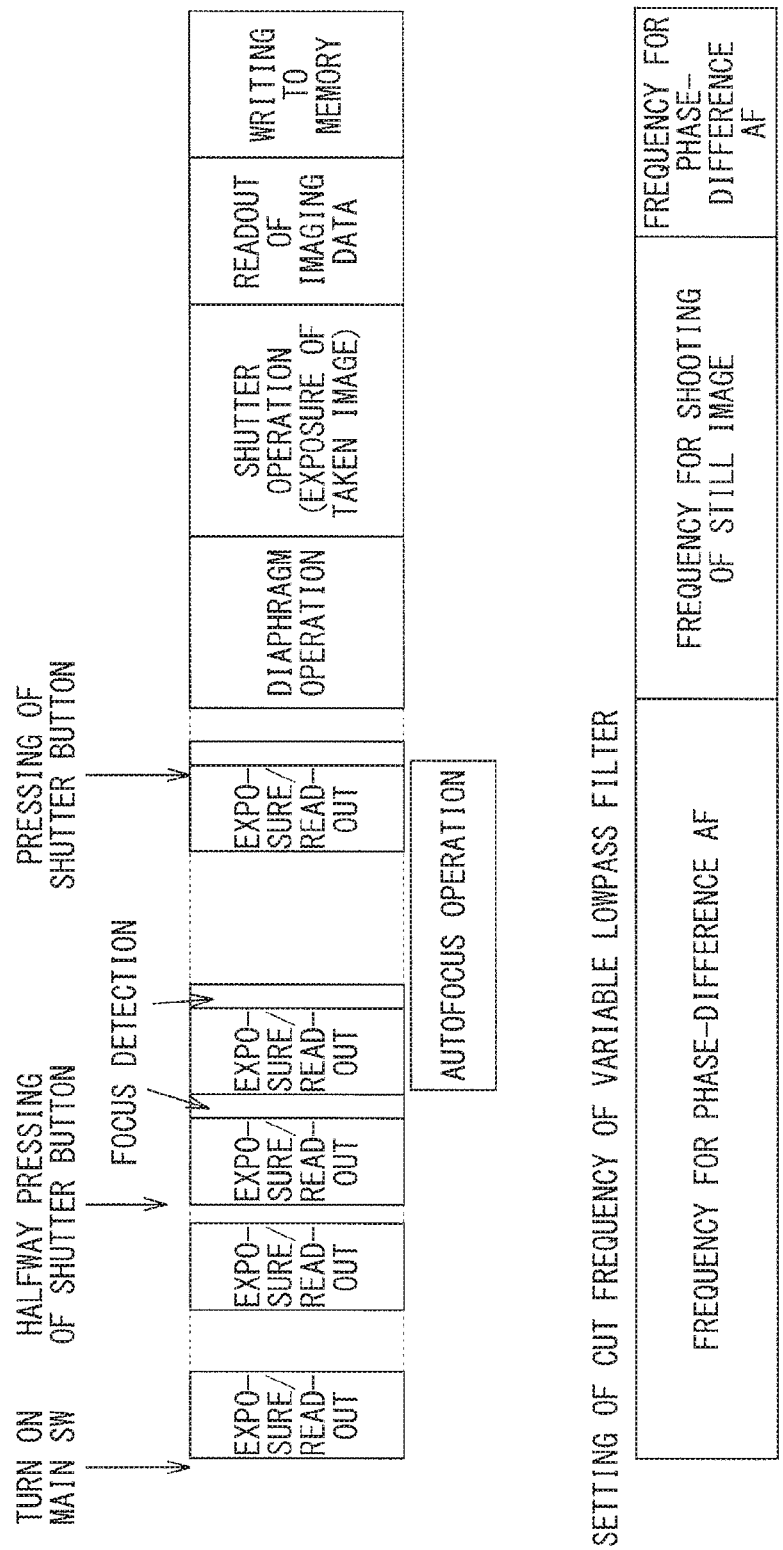
[FIG. 18]

and IMAGING APPARATUS

LOWPASS FILTER CONTROL APPARATUS, LOWPASS FILTER CONTROL METHOD, AND IMAGING APPARATUS

CROSS REFERENCE TO RELATED APPLICATIONS

This application is a U.S. National Phase of International Patent Application No. PCT/JP2017/001692 filed on Jan. 19, 2017, which claims priority benefit of Japanese Patent Application No. JP 2016-048401 filed in the Japan Patent Office on Mar. 11, 2016. Each of the above-referenced applications is hereby incorporated herein by reference in its entirety.

TECHNICAL FIELD

The present disclosure relates to a lowpass filter control apparatus, a lowpass filter control method, and an imaging apparatus that are applied to shooting with use of a variable lowpass filter.

BACKGROUND ART

Typically, compact cameras and mirrorless cameras adopt contrast system autofocus (contrast AF). In contrast, in order to achieve high-speed autofocus, there is proposed phase-difference system autofocus (phase-difference AF) in which pixels for phase-difference detection (phase-difference pixel) are embedded in an imaging element.

CITATION LIST

Patent Literature

PTL 1: Japanese Unexamined Patent Application Publication No. 2013-190603
PTL 2: Japanese Unexamined Patent Application Publication No. H05-048951

SUMMARY OF THE INVENTION

In a case where the phase-difference AF is adopted, the number of embedded phase-difference pixels is limited in order not to deteriorate quality of a shot image by an influence of the embedded phase-difference pixels. Hence, in particular, in focus detection of a high-frequency subject, etc., detection data of a sufficient sampling number is obtained, which may cause an error in focus detection in some cases.

It is desirable to provide a lowpass filter control apparatus, a lowpass filter control method, and an imaging apparatus that are allowed for high-accuracy focus detection.

A lowpass filter control apparatus according to an embodiment of the present disclosure includes a lowpass filter controller that causes lowpass characteristics of a variable lowpass filter disposed in an optical path of incoming light into an imaging element including phase-difference pixels and normal pixels to be different for an exposure period of the normal pixels and an exposure period of the phase-difference pixels.

A lowpass filter control method according to an embodiment of the present disclosure includes causing lowpass characteristics of a variable lowpass filter disposed in an optical path of incoming light into an imaging element including phase-difference pixels and normal pixels to be different for an exposure period of the normal pixels and an exposure period of the phase-difference pixels.

An imaging apparatus according to an embodiment of the present disclosure includes an imaging element including phase-difference pixels and normal pixels; a variable lowpass filter disposed in an optical path of incoming light into the imaging element; and a lowpass filter controller that causes lowpass characteristics of the variable lowpass filter to be different for an exposure period of the normal pixels and an exposure period of the phase-difference pixels.

In the lowpass filter control apparatus, the lowpass filter control method, or the imaging apparatus according to the embodiment of the present disclosure, the variable lowpass filter is controlled to cause the lowpass characteristics to be different for the exposure period of the normal pixels and the exposure period of the phase-difference pixels.

According to the lowpass filter control apparatus, the lowpass filter control method, or the imaging apparatus according to the embodiment of the present disclosure, the variable lowpass filter is controlled to cause the lowpass characteristics to be different for the exposure period of the normal pixels and the exposure period of the phase-difference pixels, which makes it possible to perform high-accuracy focus detection.

It is to be noted that effects described here are not necessarily limited and may include any of effects described in the present disclosure.

BRIEF DESCRIPTION OF THE DRAWINGS

FIG. 1 is a cross-sectional view of an outline of an imaging apparatus according to a first embodiment of the present disclosure.
FIG. 2 is a block diagram illustrating a configuration example of a control system of the imaging apparatus.
FIG. 3 is a top view of a configuration example of a phase-difference pixel.
FIG. 4 is a cross-sectional view of a configuration example of the phase-difference pixel.
FIG. 5 is a configuration diagram illustrating a pixel structure including the phase-difference pixels.
FIG. 6 is an explanatory diagram illustrating a first example of an ideal output value and a reproduced output value of the phase-difference pixels in a case where a variable lowpass filter does not reduce high-frequency components.
FIG. 7 is an explanatory diagram illustrating a first example of the ideal output value and the reproduced output value of the phase-difference pixels in a case where the variable lowpass filter reduces high-frequency components.
FIG. 8 is an explanatory diagram illustrating a second example of the ideal output value and the reproduced output value of the phase-difference pixels in the case where the variable lowpass filter does not reduce high-frequency components.
FIG. 9 is an explanatory diagram illustrating a second example of the ideal output value and the reproduced output value of the phase-difference pixels in the case where the variable lowpass filter reduces high-frequency components.
FIG. 10 is a flow chart illustrating an example of an operation of controlling a cut frequency of the variable lowpass filter.
FIG. 11 is a flow chart illustrating an example of the operation of controlling the cut frequency of the variable lowpass filter.

FIG. 12 is a flow chart illustrating an example of the operation of controlling the cut frequency of the variable lowpass filter.

FIG. 13 is a flow chart illustrating an example of the operation of controlling the cut frequency of the variable lowpass filter.

FIG. 14 is a flow chart illustrating an example of the operation of controlling the cut frequency of the variable lowpass filter.

FIG. 15 is a flow chart illustrating an example of the operation of controlling the cut frequency of the variable lowpass filter.

FIG. 16 is a flow chart illustrating an example of an operation of compositely controlling the cut frequency of the variable lowpass filter.

FIG. 17 is an explanatory diagram illustrating an example of the cut frequency of the variable lowpass filter.

FIG. 18 is a sequence diagram illustrating a sequence example in a case of setting to a cut frequency for phase-difference AF.

MODES FOR CARRYING OUT THE INVENTION

In the following, some embodiments of the present disclosure are described in detail with reference to the drawings. It is to be noted that description is given in the following order.

1. First Embodiment
  1.1 Configuration Example of Imaging Apparatus (FIGS. 1 and 2)
  1.2 Configuration and Principle of Phase-difference Pixel (FIGS. 3 to 5)
  1.3 Specific Examples of Control Operation of Variable Lowpass Filter (FIGS. 6 to 18)
  1.4 Effects
2. Other Embodiments

1. First Embodiment

In a case where phase-difference AF is adopted, the number of embedded phase-difference pixels is limited in order not to deteriorate quality of a shot image by an influence of the embedded phase-difference pixels. Hence, in particular, in focus detection of a high-frequency subject, etc., detection data of a sufficient sampling number is obtained, which may cause an error in focus detection in some cases. In contrast, in some digital cameras, in order to reduce a component of a specific or higher frequency of incoming light, an optical lowpass filter is disposed in front of an imaging element to reduce a moiré phenomenon. Moreover, there is proposed a technique of allowing for change of a frequency to be reduced by the optical lowpass filter and setting, for example, an optimum frequency for each of an all-pixel readout mode such as a still image and a readout mode, in which addition or thinning of pixels is performed, such as a moving image (e.g. PTL 1). Moreover, in order to eliminate deterioration in focus detection accuracy specific to a contrast AF system that occurs in a case where the optical lowpass filter is provided in front of a taking lens, there is also proposed a technique of rotating the optical lowpass filter to make a cutoff frequency variable (e.g. PTL 2).

These existing technologies are techniques to reduce moiré of an image and solve issues specific to the contrast AF system. Accordingly, for example, there is proposed a control method in which while high-frequency components are reduced by the optical lowpass filter upon normal shooting to reduce moiré, the high-frequency components are prevented from being reduced upon focus detection. However, in a case where upon phase-difference system focus detection, control is performed not to reduce the high-frequency components, focus detection accuracy is deteriorated by contraries by a limit to the number of embedded phase-difference detection pixels as described above.

The present embodiment therefore provide an imaging apparatus allowing for high-accuracy focus detection.

[1.1 Configuration Example of Imaging Apparatus]

(Outline of Imaging Apparatus)

FIG. 1 illustrates an outline of an imaging apparatus according to a first embodiment of the present disclosure.

The imaging apparatus according to the present embodiment includes a lens unit 1 and a camera body on which the lens unit 1 is mounted. The camera body includes an electronic viewfinder (EVF) 2, a variable lowpass filter (LPF) 3, an imaging element 4, and a liquid crystal display unit 5.

The lens unit 1 forms an optical image of a subject on the imaging element 4. The lens unit 1 includes a focus lens for focusing.

The imaging element 4 includes a CCD (Charge Coupled Device) sensor, a CMOS (Complementary Metal Oxide Semiconductor) sensor, or the like. The imaging element 4 performs photoelectric conversion and A/D (analog-to-digital) conversion on the optical image formed by the lens unit 1 to output an imaging signal corresponding to the optical image. The imaging element 4 includes pixels 10 and phase-difference pixels 20, as illustrated in FIGS. 3 to 5 to be described later. The phase-difference pixels 20 are pixels used to perform focus detection by the phase-difference system. The pixels 10 are normal pixels used to generate a shot image of the subject.

The variable lowpass filter 3 is disposed in front of the imaging element 4 in an optical path of incoming light into the imaging element 4. The variable lowpass filter 3 has a variable cut frequency as one of lowpass characteristics, and reduces a component of a frequency exceeding the cut frequency of the incoming light into the imaging element 4.

As the variable lowpass filter 3, it is possible to use, for example, a variable optical lowpass filter (OLPF) in which the lowpass characteristics are changed by controlling a degree of light separation of the incoming light. The variable optical lowpass filter includes, for example, a first birefringent plate and a second birefringent plate, a liquid crystal layer, and a first electrode and a second electrode, and has a configuration in which the liquid crystal layer is interposed between the first electrode and the second electrode, and is further interposed between the first birefringent plate and the second birefringent plate from the outside thereof. In the variable optical lowpass filter, it is possible to control a polarization state of light to continuously change the lowpass characteristics and change the cut frequency. In the variable optical lowpass filter, changing an electric field to be applied to the liquid crystal layer (a voltage applied between the first electrode and the second electrode) makes it possible to control the lowpass characteristics.

(Configuration of Control System of Imaging Apparatus)

FIG. 2 illustrates a configuration example of a control system of the imaging apparatus.

The imaging apparatus includes a memory 7, a lens driving controller 11, an imaging unit 41, a main controller 42, an imaging controller 43, a variable lowpass filter controller 44, a signal processor 45, an image processor 46, a focus controller 47, a phase-difference focus detector 48, and an operation unit 50.

The imaging unit 41 includes the above-described imaging element 4. The image processor 46 includes a contrast focus detector 49. The image processor 46 may be coupled to an external monitor 6. The operation unit 50 includes a main switch (main SW) 51 and a shutter button 52. The shutter button 52 is also called release button.

The imaging apparatus according to the present embodiment has a manual focus mode and an autofocus (AF) mode as focusing modes. The autofocus mode has a phase-difference AF mode and a contrast AF mode. Moreover, the autofocus mode may have a hybrid AF mode that is a combination of phase-difference AF and contrast AF. Focus detection in the phase-difference AF mode is performed in the phase-difference focus detector 48. Focus detection in the contrast AF mode is performed in the contrast focus detector 49.

Moreover, the imaging apparatus according to the present embodiment has a single AF mode and a continuous AF mode. In the single AF mode, a focus (a focal position) is fixed after focusing, and in the continuous AF mode, the focal position is continuously tracked in accordance with movement of a subject.

Further, the imaging apparatus according to the present embodiment has a live view mode (LV mode) in which a shot image is displayed on the liquid crystal display unit 5 or the external monitor 6. Furthermore, the imaging apparatus has a magnified display mode in which the shot image is magnified and displayed in the live view mode. For example, the imaging apparatus is set to the magnified display mode, for example, in a focus magnification mode or in a monitor output mode. In the focus magnification mode, the shot image is magnified and displayed for focusing, and in the monitor output mode, the shot image is displayed on the external monitor 6.

(Outline of Operation of Imaging Apparatus)

In the imaging apparatus according to the present embodiment, the main controller 42 controls operation timings of various controllers. In a case where the main switch 51 is turned on to start a shooting operation, an instruction of the live view mode is provided from the imaging controller 43 to the imaging unit 41, and an image signal for the live view mode is transmitted to the signal processor 45.

The signal processor 45 separates the image signal for the live view mode and a signal for phase-difference detection. The signal processor 45 outputs the signal for phase-difference detection to the phase-difference focus detector 48. In the phase-difference focus detector 48, a phase-difference detection value is calculated on the basis of the signal for phase-difference detection, and is transmitted to the focus controller 47.

In contrast, the image signal for the live view mode is outputted to the image processor 46. In the image processor 46, the contrast focus detector 49 performs focus detection calculation by the contrast system on the basis of the image signal, and a thus-obtained contrast detection value is transmitted to the focus controller 47.

Thereafter, in a case where a focus detection operation is started by a halfway press operation of the shutter button 52, etc., the focus controller 47 calculates a final focus adjustment control amount with use of the phase-difference detection value and the contrast detection value, and transmits a thus-obtained result to the lens driving controller 11. For calculation of the focus adjustment control amount by the focus controller 47, lens data 12 of the lens unit 1 is referred to as appropriate. The lens driving controller 11 causes the focus lens of the lens unit 1 to operate on the basis of the focus adjustment control amount. Thus, a focus adjustment operation (autofocus operation) is performed.

Thereafter, in a case where a shooting operation is started by a full-press operation of the shutter button 52, an instruction of a shot image mode is provided from the imaging controller 43, and a signal for the shot image is transmitted to the signal processor 45. Thus, the shot image is generated. Data of the generated shot image is converted into a predetermined image format by the image processor 46, and is stored in the memory 7 or an unillustrated external memory.

In contrast, the variable lowpass filter controller 44 controls the cut frequency of the variable lowpass filter 3. The main controller 42 is allowed to control the cut frequency of the variable lowpass filter 3 through the variable lowpass filter controller 44 in accordance with various setting states and various shooting states so as to allow for achievement of a lowpass effect suitable for the shot image or the focus detection.

It is to be noted that the configuration example in FIG. 2 involves an example in which various kinds of signal processing are performed in a block different from the imaging unit 41. Alternatively, some or all of the various kinds of signal processing may be performed in the imaging unit 41. For example, a portion or the entirety of the signal processor 45, the image processor 46, and the phase-difference focus detector 48 may be modularized and integrated in the imaging unit 41.

[1.2 Configuration and Principle of Phase-Difference Pixel]

FIGS. 3 and 4 illustrate a configuration example of the phase-difference pixel 20 embedded in the imaging element 4. FIG. 3 illustrates the configuration example of the phase-difference pixel 20 as viewed from above. FIG. 4 illustrates a cross-sectional configuration example of the phase-difference pixel 20.

The phase-difference pixels 20 includes a pair of phase-difference pixels 20A and 20B. The pair of phase-difference pixels 20A and 20B each include a photodiode 24 and a filter unit that limits incoming light into the photodiode 24. The filter unit includes a light-shielding film 21, a transmission unit 22, and a microlens 23.

In each of the pair of phase-difference pixels 20A and 20B, about a half of the incoming light into the photodiode 24 is shielded by the light-shielding film 21. Rays having different angles of the incoming light are detected by the photodiodes 24 of the pair of respective phase-difference pixels 20A and 20B. Thus, a pupil region in the microlens 23 is divided to allow light to enter one phase-difference pixel 20A and the other phase-difference pixel 20B at symmetric angles. As a result, a received light amount distribution of one pixel group of the phase-difference pixels 20A and a received light amount distribution of another pixel group of the phase-difference pixels 20B are deviated in light amount distribution position from each other. A deviation amount between these received light amount distributions is a value corresponding to a deviation amount of a focal point in an optical axis direction. Accordingly, the deviation amount between the received light amount distributions is detected as a phase difference to determine the deviation amount of the focal point in the optical axis direction.

FIG. 5 illustrates an entire configuration example of the pixel 10 in the imaging element 4.

The pixels 10 of the imaging element 4 have, for example, a coding pattern called Bayer pattern. The pixels 10 include pixels of three colors R (red), G (green), and B (blue) that are two-dimensionally arranged and are different in position from one another. It is to be noted that in FIG. 5, the pixel of the color B is referred to Br. It is to be noted that in FIG. 5, the Bayer pattern is exemplified as a pixel structure; however, the pixel structure may be any structure other than the Bayer pattern. Moreover, the pixels 10 may include pixels other than R, G, and B. For example, the pixels 10 may further include a W (white) pixel.

Herein, in a case where the phase-difference pixels 20 are embedded in the imaging element 4, it is necessary to determine shooting pixel values at positions where the phase-difference pixels 20 are embedded, by estimation from pixel values at any other pixel positions by complementing processing, etc. Accordingly, while focus detection accuracy is improved more with an increasing number of phase-difference pixels 20 embedded in the imaging element 4, the pixel number of phase-difference pixels 20 is limited in order not to affect image quality of the shot image. Hence, in actuality, the phase-difference pixels 20 are embedded in the imaging element 4 at suitable intervals as illustrated in FIG. 5 so as to appropriately perform the complementing processing by the pixels 10 around the phase-difference pixels 20 upon obtaining the shot pixel value.

(Example 1 of Output Value of Phase-Difference Pixel 20 and Effect of Variable Lowpass Filter 3)

FIG. 6 illustrates a first example of an ideal output value and a reproduced output value of the phase-difference pixels 20 in a case where the variable lowpass filter 3 does not reduce high-frequency components. FIG. 6 illustrates an example of an output value in a case where focus detection is performed on a monochrome single-edge subject by the phase-difference pixel 20.

On a left side of FIG. 6, 60A indicates an output (an ideal value) by one pixel group of the phase-difference pixels 20A, and 60B indicates an output (an ideal value) by another pixel group of the phase-difference pixels 20B. These ideal outputs are outputs of optical images (an A image and a B image) in phase-difference pixels 20A and 20B in a case where it is assumed that an infinity number of the phase-difference pixels 20A and 20B are embedded. Pa and Pb are sampling points where actual outputs are obtained in the phase-difference pixels 20A and 20B. Pa indicates a sampling point by the one phase-difference pixel 20A, and Pb indicates a sampling point by the other phase-difference pixel 20B.

In actuality, the phase-difference pixels 20A and 20B are disposed at intervals; therefore, the outputs are obtainable only at the sampling points Pa and Pb. A right side of FIG. 6 illustrates an example in which an output of a phase difference is reproduced on the basis of the outputs from the sampling points Pa and Pb on the left side of FIG. 6. 61A indicates an output (a reproduced value) by the one phase-difference pixel 20A, and 61B indicates an output (a reproduced value) by the other phase-difference pixel 20B. As illustrated on the right side of FIG. 6, in a case where a phase difference is reproduced only by the outputs from the sampling points Pa and Pb, the phase difference has a different value from an intrinsic phase difference illustrated on the left side of FIG. 6. Hence, performing focus detection on the basis of this phase difference causes a focus detection error.

As described above, in a case where the phase-difference pixels 20 are embedded at intervals in the imaging element 4, a focus detection error may occur in some cases. As illustrated in FIG. 7, it is possible to reduce the focus detection error by setting the cut frequency of the variable lowpass filter 3 to reduce frequency components suitable for arrangement of the phase-difference pixels 20, thereby allowing for phase-difference detection with high accuracy.

FIG. 7 illustrates a first example of the ideal output value and the reproduced output value of the phase-difference pixels 20 in a case where the variable lowpass filter 3 reduces the high-frequency components. FIG. 7 illustrates an example of an output value in a case where focus detection is performed on a monochrome single-edge subject by the phase-difference pixels 20, as with FIG. 6.

On a left side of FIG. 7, the output (the ideal value) 60A by the one pixel group of the phase-difference pixels 20 and the output (the ideal value) by another pixel group of the phase-difference pixels 20B are illustrated, as with the left side of FIG. 6. Moreover, Pa and Pb are sampling points where actual outputs are obtained in the phase-difference pixels 20A and 20B.

A right side of FIG. 7 illustrates an example in which an output of a phase difference is reproduced on the basis of the outputs from the sampling points Pa and Pb on the left side of FIG. 7. 61A indicates an output (a reproduced value) by the one phase-difference pixel 20A, and 61B indicates an output (a reproduced value) by the other phase-difference pixel 20B.

As can be seen from FIG. 7, even in a case where the variable lowpass filter 3 reduces the high-frequency components to reproduce the phase difference only by the outputs from the sampling points Pa and Pb, it is possible to obtain a value close to the intrinsic phase difference illustrated on the left side of FIG. 7. Hence, performing focus detection on the basis of this phase difference reduces the focus detection error.

(Example 2 of Output Value of Phase-Difference Pixel 20 and Effect of Variable Lowpass Filter 3)

FIG. 8 illustrates a second example of the ideal output value and the reproduced output value of the phase-difference pixels 20 in the case where the variable lowpass filter 3 does not reduce high-frequency components. FIG. 9 illustrates a second example of the ideal output value and the reproduced output value of the phase-difference pixels 20 in the case where the variable lowpass filter 3 reduces the high-frequency components.

FIGS. 8 and 9 illustrate an example of an output value in a case where focus detection is performed on a subject having many high-frequency components by the phase-difference pixels 20.

On a left side of FIG. 8, the output (the ideal value) 60A by the one pixel group of the phase-difference pixels 20A and the output (the ideal value) by another pixel group of the phase-difference pixels 20B are illustrated, as with the left side of FIG. 6. Moreover, Pa and Pb are sampling points where actual outputs are obtained in the phase-difference pixels 20A and 20B.

A right side of FIG. 8 illustrates an example in which an output of a phase difference is reproduced on the basis of the outputs from the sampling points Pa and Pb on the left side of FIG. 8. 61A indicates an output (a reproduced value) by the one phase-difference pixel 20A, and 61B indicates an output (a reproduced value) by the other phase-difference pixel 20B.

In a case where a phase difference with respect to the subject having many high-frequency components is reproduced only by the outputs from the sampling points Pa and Pb, not only a phase difference error is large, but also it is not possible to reproduce an intrinsic phase difference, which may make the phase-difference detection inexecutable in some cases. Hence, performing focus detection on the basis of the phase difference causes a large focus detection error or a case where focus detection is made inexecutable.

A left side of FIG. 9 illustrates the output (the ideal value) 60A by the one pixel group of the phase-difference pixels 20A and the output (the ideal value) by another pixel group of the phase-difference pixels 20B, as with the left side of FIG. 6. Moreover, Pa and Pb are sampling points where actual outputs are obtained in the phase-difference pixels 20A and 20B.

A right side of FIG. 9 illustrates an example in which an output of a phase difference is reproduced on the basis of the outputs from the sampling points Pa and Pb on the left side of FIG. 9. 61A indicates an output (a reproduced value) by the one phase-difference pixel 20A, and 61B indicates an output (a reproduced value) by the other phase-difference pixel 20B.

As can be seen from FIG. 9, even in a case where the variable lowpass filter 3 reduces the high-frequency components to reproduce the phase difference only by the outputs from the sampling points Pa and Pb, it is possible to obtain a value close to the intrinsic phase difference illustrated on the left side of FIG. 9. Even with respect to the subject having many high-frequency components, reducing the high-frequency components by the variable lowpass filter 3 causes relatively high waveform reproducibility, thereby making the phase-difference detection easy. Hence, performing focus detection on the basis of the phase difference reduces the focus detection error.

[1.3 Specific Examples of Control Operation of Variable Lowpass Filter]

In the imaging apparatus according to the present embodiment, the variable lowpass filter controller 44 follows an instruction by the main controller 42, and performs control of the lowpass characteristics of the variable lowpass filter 3 in accordance with various setting states and various shooting states. For example, as the control of the lowpass characteristics, the following control of the cut frequency of the variable lowpass filter 3 is performed. It is to be noted that in the following, description is given with reference to FIGS. 10 to 15 as appropriate.

The variable lowpass filter controller 44 controls the variable lowpass filter 3 so as to perform switching of the cut frequency between frequencies that are different in a phase-difference detection operation by the phase-difference focus detector 48 and in a shooting operation. In this case, the variable lowpass filter 3 is preferably controlled to cause the cut frequency in the phase-difference detection operation to be lower than that in the shooting operation. The shooting operation herein is an operation of generating an image on the basis of the pixels 10 that are normal pixels, and includes an exposure period of the pixels 10. Moreover, the phase-difference detection operation is a focus detection operation by a phase-difference system on the basis of the phase-difference pixels 20, and includes an exposure period of the phase-difference pixels 20.

Moreover, the variable lowpass filter controller 44 may change the cut frequency in accordance with a condition of the subject in the phase-difference detection operation.

For example, in the phase-difference detection operation, in a case where luminance of the subject is lower than predetermined luminance (step S105; Y), the variable lowpass filter controller 44 controls the variable lowpass filter 3 to cause the cut frequency to be higher than that in a case where the subject has higher luminance than the predetermined luminance (step S105; N), as illustrated in FIG. 14. Moreover, for example, in the phase-difference detection operation, in a case where contrast of the subject is lower than predetermined contrast (step S105; Y), the variable lowpass filter controller 44 controls the variable lowpass filter 3 to cause the cut frequency to be higher than that in a case where the contrast of the subject is higher than the predetermined contrast (step S105; N).

Further, for example, in the phase-difference detection operation, in a case where a value of a predetermined high-frequency component included in the subject is higher than a predetermined value, the variable lowpass filter controller 44 controls the variable lowpass filter 3 to cause the cut frequency to be lower than that in a case where the value of the predetermined high-frequency component is lower than the predetermined value. Furthermore, for example, in the phase-difference detection operation, in a case where a value of a predetermined strong edge component included in the subject is higher than a predetermined value, the variable lowpass filter controller 44 controls the variable lowpass filter 3 to cause the cut frequency to be lower than that in a case where the value of the predetermined strong edge component is lower than the predetermined value.

Moreover, the variable lowpass filter controller 44 may change the cut frequency in accordance with a deviation amount of a focal point in the phase-difference detection operation.

For example, in the phase-difference detection operation, in a case where the deviation amount of the focal point is within a predetermined range (close into focus) (step S106; Y), the variable lowpass filter controller 44 controls the variable lowpass filter 3 to cause the cut frequency to be lower than that in a case where the deviation amount of the focal point is out of the predetermined range (step S106; N), as illustrated in FIG. 15.

Moreover, for example, in an operation by the manual focus mode (step S103; Y), the variable lowpass filter controller 44 controls the variable lowpass filter 3 to cause the cut frequency to be higher than that in an operation by the autofocus mode (step S103; N), as illustrated in FIG. 12.

Further, for example, the variable lowpass filter controller 44 may change the cut frequency in accordance with a magnification of magnified display in the magnified display mode, as illustrated in FIG. 12. For example, the variable lowpass filter controller 44 controls the variable lowpass filter 3 to cause the cut frequency to be higher with an increase in the magnification of magnified display in the focus magnification mode, the monitor output mode, etc. (step S103; Y).

Furthermore, in the focus detection operation, in a case where the contrast detection operation is performed by the contrast focus detector 49, the variable lowpass filter controller 44 may control the variable lowpass filter 3 to cause the cut frequency to be higher than that in a case where the contrast detection operation is not performed.

Moreover, for example, the variable lowpass filter controller 44 may control the variable lowpass filter 3 to cause the cut frequency to be lower in the continuous AF mode (step S104; N) than in the single AF mode (step S104; Y), as illustrated in FIG. 13.

Further, in a case where shooting of a moving image is in progress, the variable lowpass filter controller 44 may control the variable lowpass filter 3 to cause the cut frequency to be lower than that in a case where shooting of a still image is in progress.

Furthermore, for example, in a case where shooting of a still image by turning on the shutter button 52 is in progress, the variable lowpass filter controller 44 may control the variable lowpass filter 3 to cause the cut frequency to be higher than that in the AF mode or the LV mode, as illustrated in FIG. 11.

FIG. 16 illustrates an example of an operation of compositely controlling the cut frequency of the variable lowpass filter 3 (a cut frequency setting operation). The above-described control of the variable lowpass filter 3 illustrated in FIGS. 10 to 15 may be compositely performed as illustrated in FIG. 16. It is to be noted that a flow of composite control illustrated in FIG. 16 is an example, and respective steps may be executed in order different from order in the example illustrated in FIG. 16. Moreover, the composite control may be performed in a combination different from a combination of respective steps illustrated in FIG. 16.

First, the main controller 42 determines whether or not shooting of a moving image is in progress (step S101). In a case where the main controller 42 determines that shooting of the moving image is in progress (step S101; Y), the main controller 42 causes variable lowpass filter controller 44 to set the cut frequency of the variable lowpass filter 3 to a cut frequency (a frequency 1) suitable for an image of shooting of the moving image (step S110). In shooting of the moving image, addition processing or pixel thinning processing are frequently performed; therefore, the cut frequency is desirably set to a lower frequency than that for an image of shooting of a still image. In order to perform optimization for autofocus (phase-difference detection) during shooting of the moving image, the cut frequency is desirably set to a lower frequency; however, the cut frequency is set to a cut frequency suitable for the image of shooting of the moving image in preference to quality of a stored image.

In a case where the main controller 42 determines that shooting of the moving image is not in progress (step S101; N), the main controller 42 next determines whether or not shooting of the still image by pressing the shutter button to turn on the shutter button 52 is in progress (step S102). In a case where the main controller 42 determines that shooting of the still image is in progress (step S102; Y), the main controller 42 causes the variable lowpass filter controller 44 to set the cut frequency of the variable lowpass filter 3 to a cut frequency (a frequency 2) suitable for an image of shooting of the still image (step S109).

In a case where the main controller 42 determines that shooting of the still image is not in progress (step S102; N), the main controller 42 next determines whether or not the manual focus mode, the focus magnification mode, or the monitor output mode is established (step S103). In a case where the main controller 42 determines that one of these modes is established (step S103; Y), the main controller 42 causes the variable lowpass filter controller 44 to set the cut frequency of the variable lowpass filter 3 to a cut frequency (a frequency 3) suitable for the live view mode (step S108). In the manual focus mode, the focus magnification mode, or the monitor output mode, a shot image is magnified and displayed on the liquid crystal display unit 5 or the external monitor 6. Accordingly, in order to improve visibility of the image, it is desirable to set the cut frequency slightly higher to leave the high-frequency components. It is to be noted that, in FIG. 16, the cut frequency is set to the cut frequency (frequency 3) for the live view mode in all of the manual focus mode, the focus magnification mode, and the monitor output mode; however, the cut frequency may be set to individual optimum cut frequencies for the respective modes. This also applies to the following flow.

In a case where the main controller 42 determines that none of the manual focus mode, the focus magnification mode, and the monitor output mode is established (step S103; N), the main controller 42 next determines whether or not the single AF mode is established (step S104).

Even a camera that performs focus detection by the phase-difference system may perform shooting in the hybrid AF mode using focus detection by the phase-difference system and focus detection by the contrast system in some cases. In general, in the contrast AF, accuracy is high, but a focal position where the high-frequency component becomes highest is detected while moving a lens position. Accordingly, it takes time for detection, and in some cases, detection may slow in a case where an out-of-focus amount is large. In order to solve this issue, combined use with focus detection by the phase-difference detection achieves high-speed and high-accuracy autofocus. However, in the contrast AF, the high-frequency components are detected; therefore, it is desirable not to excessively reduce the high-frequency components, and in a single AF shooting mode, the cut frequency is set to the same cut frequency (the frequency 3) as that in the live view mode (step S108). However, even in the single AF mode, it is possible to sequentially switch the cut frequency in a case where focus detection by the phase-difference system is performed and in a case where focus detection by the contrast system is performed.

In contrast, in a case where the single AF mode is not established (step S104; N), the continuous AF mode in which the focal position is continuously tracked in accordance with movement of the subject is established. In this case, autofocus by phase-difference detection is mainly used in preference to detection speed; therefore, the main controller 42 causes the variable lowpass filter controller 44 to basically set the variable lowpass filter controller 44 to an optimum cut frequency (a frequency 4) for phase-difference AF (step S107).

However, even in this case, in a case where focus detection is performed on a subject having less high-frequency components and having low luminance and low contrast as the conditions of the subject (step S105; Y), the cut frequency is desirably set to a slightly higher cut frequency (the frequency 3). The subject having low luminance and low contrast is considered advantageous in accuracy in a case where the frequency is not cut. Alternatively, even setting the cut frequency to the slightly higher cut frequency (the frequency 3) for any subject other than the subject including the high-frequency components or the strong edge components that causes an increase in detection error makes it possible to achieve similar effects.

Moreover, in a case where the deviation amount of the focal point is out of the predetermined range and the subject is out of focus (step S106; N), the subject includes many low-frequency components, and a focus detection error resulting from the interval between the above-described phase-difference pixels 20 is less likely to occur. Accordingly, in a case where the deviation amount of the focal point is out of the predetermined range, it is desirable to set the cut frequency to the slightly higher cut frequency (the frequency 3) to rather leave the high-frequency components. Further, in a case where the subject is brought close into focus (step S106; Y), it is preferable to set the cut frequency to the cut frequency (the frequency 4) for phase-difference AF.

It is also possible to determine the above switching of the cut frequency in accordance with conditions of the subject by information other than focus detection, for example, luminance information and image information of the subject, and it is possible to estimate the switching from past focus detection information.

FIG. 17 illustrates an example of a relative relationship of the frequencies 1 to 4 illustrated in the example in FIG. 16.

As illustrated in FIG. 17, (the frequency 4)<(the frequency 3)<(the frequency 1)<(the frequency 2) is preferably set in increasing order of the cut frequency.

Sequence Example

FIG. 18 illustrates a sequence example in a case of setting to the cut frequency (the frequency 4) for phase-difference AF in the flow in FIG. 16.

First, when the main switch 51 is turned on, exposure and readout start to display an image on the liquid crystal display unit 5 (live view display). Thereafter, upon start of the focus detection operation by a halfway press operation of the shutter button 5, phase-difference focus detection by output of the phase-difference pixels 20 is performed after exposure and readout to start a phase-difference AF operation. At this time, the variable lowpass filter 3 is optically set for phase-difference detection. A user determines composition of the subject, and presses the shutter button 52 to start the shooting operation; however, at this time, in the imaging apparatus, diaphragm control is performed to perform exposure of an image for shooting. Before the exposure starts, the main controller 42 performs control to cause the variable lowpass filter controller 44 to set the cut frequency of the variable lowpass filter 3 to a cut frequency suitable for a shot image. Thereafter, readout of image data and writing to the memory 7 are performed. However, after the exposure is completed, for a next focus detection operation, the cut frequency is returned to the cut frequency for phase-difference focus detection. It is to be noted that in a case where the mode is set to a continuous shooting mode or the like to continuously perform exposure and readout, the main controller 42 causes the variable lowpass filter controller 44 to set the cut frequency of the variable lowpass filter 3 to a cut frequency for the shot image.

[1.4 Effects]

As described above, according to the present embodiment, the lowpass characteristics of the variable lowpass filter 3 are caused to be different for the exposure period of the pixels 10 that are normal pixels and the exposure period of the phase-difference pixels 20, which makes it possible to perform high-accuracy focus detection.

According to the present embodiment, in a case where phase-difference focus detection is performed, the cut frequency of the variable lowpass filter 3 is set to a frequency suitable for the phase difference detection so as to reduce a focus detection error, which makes it possible to perform high-accuracy focus detection.

It is to be noted that the effects described in the description are merely illustrative and non-limiting, and other effects may be included. This applies to effects achieved by the following other embodiments.

2. Other Embodiments

The technology achieved by present disclosure is not limited to description of the above-described respective embodiments, and may be modified in a variety of ways.

For example, the variable lowpass filter 3 is not limited to the optical variable lowpass filter, and may have any other configuration. For example, a piezoelectric device may be used to minutely vibrate the imaging element 4, thereby achieving a lowpass filter effect. Alternatively, the lowpass filter effect may be achieved by moving at least some lenses of the lens unit 1.

Moreover, various forms are conceivable as variations of a camera to which the imaging apparatus illustrated in FIG. 1 is applied. The lens unit 1 may be of a fixed type or an interchangeable type. In a case where the lens unit 1 is of the interchangeable type, the variable lowpass filter 3 may be provided not in the camera body but in the lens unit 1.

Further, the technology achieved by the present disclosure is applicable to an in-vehicle camera, a surveillance camera, etc. In addition, the technology achieved by the present disclosure is applicable to a camera for medical use such as an endoscope.

Furthermore, in the imaging apparatus illustrated in FIG. 1, a shooting result may be stored in the memory 7 or an external memory, or the shooting result may be displayed on the liquid crystal display unit 5; however, image data may be transmitted to any other device through a network, in place of being stored or displayed. Moreover, the signal processor 45, the image processor 46, the variable lowpass filter controller 44, etc. may be separated from a main body of the imaging apparatus. For example, these processors may be provided at an end of a network coupled to the imaging apparatus. Further, the main body of the imaging apparatus may store image data in an external memory without performing image processing, etc., and may cause a different device such as a PC (personal computer) to perform image processing.

It is to be noted that processing by the signal processor 45, the image processor 46, the variable lowpass filter controller 44, etc. may be executed as a program by a computer. A program of the present disclosure is, for example, a program provided from, for example, a storage medium to an information processing device and a computer system that are allowed to execute various program codes. Executing such a program by the information processing device or a program execution unit in the computer system makes it possible to achieve processing corresponding to the program.

Moreover, a series of image processing and control processing by the present technology may be executed by hardware, software, or a combination thereof. In a case where processing by software is executed, it is possible to install a program holding a processing sequence in a memory in a computer that is built in dedicated hardware, and cause the computer to execute the program, or it is possible to install the program in a general-purpose computer that is allowed to execute various kinds of processing, and cause the general-purpose computer to execute the program. For example, it is possible to store the program in the storage medium in advance. In addition to installing the program from the storage medium to the computer, it is possible to receive the program through a network such as LAN (Local Area Network) and the Internet and install the program in a storage medium such as a built-in hard disk.

Moreover, the present technology may have the following configurations, for example.

(1)

A lowpass filter control apparatus, including:

a lowpass filter controller that causes lowpass characteristics of a variable lowpass filter disposed in an optical path of incoming light into an imaging element including phase-difference pixels and normal pixels to be different for an exposure period of the normal pixels and an exposure period of the phase-difference pixels.

(2)

The lowpass filter control apparatus according to (1), in which the lowpass filter controller controls the variable lowpass filter to cause a cut frequency of the variable lowpass filter in the exposure period of the phase-difference pixels to be lower than the cut frequency in the exposure period of the normal pixels.

(3)

The lowpass filter control apparatus according to (1) or (2), in which the lowpass filter controller changes the lowpass characteristics in accordance with a condition of a subject in the exposure period of the phase-difference pixels.

(4)

The lowpass filter control apparatus according to (3), in which in the exposure period of the phase-difference pixels, in a case where luminance of the subject is lower than predetermined luminance or in a case where contrast of the subject is lower than predetermined contrast, the lowpass filter controller controls the variable lowpass filter to cause the cut frequency of the variable lowpass filter to be higher than the cut frequency in a case where the subject has higher luminance than the predetermined luminance or in a case where the subject has higher contrast than the predetermined contrast.

(5)

The lowpass filter control apparatus according to (3), in which in the exposure period of the phase-difference pixels, in a case where a value of a predetermined high-frequency component included in the subject is higher than a predetermined value or in a case where a value of a predetermined strong edge component included in the subject is higher than a predetermined value, the lowpass filter controller controls the variable lowpass filter to cause the cut frequency of the variable lowpass filter to be lower than the cut frequency in a case where the value of the predetermined high-frequency component is lower than the predetermined value or in a case where the value of the predetermined strong edge component is lower than the predetermined value.

(6)

The lowpass filter control apparatus according to any one of (1) to (5), in which the lowpass filter controller changes the cut frequency of the variable lowpass filter in accordance with a deviation amount of a focal point in a phase-difference detection operation by the phase-difference pixels.

(7)

The lowpass filter control apparatus according to (6), in which in the phase-difference detection operation by the phase-difference pixels, in a case where the deviation amount of the focal point is within a predetermined range, the lowpass filter controller controls the variable lowpass filter to cause the cut frequency to be lower than the cut frequency in a case where the deviation amount of the focal point is out of the predetermined range.

(8)

The lowpass filter control apparatus according to any one of (1) to (7), in which in an operation by a manual focus mode, the lowpass filter controller controls the variable lowpass filter to cause a cut frequency of the variable lowpass filter to be higher than the cut frequency in an operation by an autofocus mode.

(9)

The lowpass filter control apparatus according to any one of (1) to (8), in which the lowpass filter controller changes a cut frequency of the variable lowpass filter in accordance with a magnification of magnified display in a magnified display mode in which a shot image by the normal pixels is magnified and displayed.

(10)

The lowpass filter control apparatus according to (9), in which the lowpass filter controller controls the variable lowpass filter to increase the cut frequency with an increase in the magnification of the magnified display.

(11)

The lowpass filter control apparatus according to any one of (1) to (10), in which in a focus detection operation, in a case where a detection operation by a contrast system is performed, the lowpass filter controller controls the variable lowpass filter to cause a cut frequency of the variable lowpass filter to be higher than the cut frequency in a case where the detection operation by the contrast system is not performed.

(12)

The lowpass filter control apparatus according to any one of (1) to (11), in which in a continuous autofocus mode in which a focal position is continuously tracked in accordance with movement of a subject, the lowpass filter controller controls the variable lowpass filter to cause a cut frequency of the variable lowpass filter to be lower than the cut frequency in a single autofocus mode in which the focal position is fixed after focusing.

(13)

A lowpass filter control method, including:

causing lowpass characteristics of a variable lowpass filter disposed in an optical path of incoming light into an imaging element including phase-difference pixels and normal pixels to be different for an exposure period of the normal pixels and an exposure period of the phase-difference pixels.

(14)

An imaging apparatus, including:

an imaging element including phase-difference pixels and normal pixels;

a variable lowpass filter disposed in an optical path of incoming light into the imaging element; and a lowpass filter controller that causes lowpass characteristics of the variable lowpass filter to be different for an exposure period of the normal pixels and an exposure period of the phase-difference pixels.

This application claims the benefit of Japanese Priority Patent Application No. 2016-048401 filed with the Japan Patent Office on Mar. 11, 2016, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A lowpass filter control apparatus, comprising:
 a lowpass filter controller configured to control that causes lowpass characteristics of a variable lowpass filter to:
  set a first cut frequency of the variable lowpass filter for an exposure period of a plurality of phase-difference pixels; and
  set a second cut frequency of the variable lowpass filter for an exposure period of a plurality of normal pixels, wherein
   the first cut frequency is lower than the second cut frequency,
   the variable lowpass filter is in an optical path of light that enters an imaging element, and
   the imaging element includes the plurality of phase-difference pixels and the plurality of normal pixels.

2. The lowpass filter control apparatus according to claim 1, wherein the lowpass filter controller is further configured to change the lowpass characteristics of the variable lowpass filter based on a condition of a subject in the exposure period of the plurality of phase-difference pixels.

3. The lowpass filter control apparatus according to claim 2, wherein
in the exposure period of the plurality of phase-difference pixels, the lowpass filter controller is further configured to control the variable lowpass filter to:
set a third cut frequency of the variable lowpass filter in a case where the subject has one of a luminance lower than a specific luminance or a contrast lower than a specific contrast; and
set a fourth cut frequency of the variable lowpass filter in a case where one of the luminance of the subject is higher than the specific luminance or the contrast of the subject is higher than the specific contrast, and the third cut frequency is higher than the fourth cut frequency.

4. The lowpass filter control apparatus according to claim 2, wherein
in the exposure period of the plurality of phase-difference pixels, the lowpass filter controller is further configured to control, the variable lowpass filter to:
set a third cut frequency of the variable lowpass filter in a case where the subject has one of a first value of a high-frequency component higher than a first specific value or a second value of a strong edge component higher than a second specific value; and
set a fourth cut frequency of the variable lowpass filter in a case where one of the first value of the high-frequency component is lower than the first specific value or the second value of the strong edge component is lower than the second specific value, and
the third cut frequency is lower than the fourth cut frequency.

5. The lowpass filter control apparatus according to claim 1, wherein the lowpass filter controller is further configured to change the first cut frequency of the variable lowpass filter based on a deviation amount of a focal point in a phase-difference detection operation by the plurality of phase-difference pixels.

6. The lowpass filter control apparatus according to claim 5, wherein
in the phase-difference detection operation by the plurality of phase-difference pixels, the lowpass filter controller is further configured to control the variable lowpass filter to:
set a third cut frequency of the variable lowpass filter in a case where the deviation amount of the focal point is within a specific range; and
set a fourth cut frequency of the variable lowpass filter in a case where the deviation amount of the focal point is out of the specific range, and
the third cut frequency is lower than the fourth cut frequency.

7. The lowpass filter control apparatus according to claim 1, wherein
the lowpass filter controller is further configured to control the variable lowpass filter to:
set a third cut frequency of the variable lowpass filter for an operation by a manual focus mode of an imaging device; and
set a fourth cut frequency of the variable lowpass filter for an operation by an autofocus mode of the imaging device, and the third cut frequency is higher than the fourth cut frequency.

8. The lowpass filter control apparatus according to claim 1, wherein
the lowpass filter controller is further configured to change a third cut frequency of the variable lowpass filter based on a magnification of a magnified display in a magnified display mode of an imaging device, and
the magnified display mode is a mode in which a shot image by the plurality of normal pixels is magnified and displayed on a display device.

9. The lowpass filter control apparatus according to claim 8, wherein the lowpass filter controller is further configured to control the variable lowpass filter to increase the third cut frequency of the variable lowpass filter with an increase in the magnification of the magnified display.

10. The lowpass filter control apparatus according to claim 1, wherein
in a focus detection operation of an imaging device, the lowpass filter controller is further configured to control the variable lowpass filter to:
set a third cut frequency of the variable lowpass filter in a case where a detection operation is executed by a contrast system; and
set a fourth cut frequency of the variable lowpass filter in a case where the detection operation is not executed by the contrast system; and
the third cut frequency is higher than the fourth cut frequency.

11. The lowpass filter control apparatus according to claim 1, wherein
the lowpass filter controller is further configured to control the variable lowpass filter to:
set a third cut frequency of the variable lowpass filter in a continuous autofocus mode in which a focal position is continuously tracked in association with movement of a subject; and
set a fourth cut frequency of the variable lowpass filter in a single autofocus mode in which the focal position is fixed after a focus operation, and
the third cut frequency is lower than the fourth cut frequency.

12. A lowpass filter control method, comprising:
controlling lowpass characteristics of a variable lowpass filter to:
set a first cut frequency of the variable lowpass filter for an exposure period of a plurality of phase-difference pixels; and
set a second cut frequency of the variable lowpass filter for an exposure period of a plurality of normal pixels, wherein
the first cut frequency is lower than the second cut frequency,
the variable lowpass filter is in an optical path of light that enters an imaging element, and
the imaging element includes the plurality of phase-difference pixels and the plurality of normal pixels.

13. An imaging apparatus, comprising:
an imaging element including a plurality of phase-difference pixels and a plurality of normal pixels;
a variable lowpass filter in an optical path of light that enters the imaging element; and
a lowpass filter controller configured to control lowpass characteristics of the variable lowpass filter to:
set a first cut frequency of the variable lowpass filter for an exposure period of the plurality of phase-difference pixels; and set a second cut frequency of the variable lowpass filter for an exposure period of the plurality of normal pixels, wherein
the first cut frequency is lower than the second cut frequency.

14. A lowpass filter control apparatus, comprising:
a lowpass filter controller configured to:
control lowpass characteristics of a variable lowpass filter, wherein
the variable lowpass filter is in an optical path of light that enters an imaging element,
the imaging element includes a plurality of phase-difference pixels and a plurality of normal pixels, and
the lowpass characteristics for an exposure period of the plurality of normal pixels is different from the lowpass characteristics for an exposure period of the plurality of phase-difference pixels; and
change a cut frequency of the variable lowpass filter based on a deviation amount of a focal point in a phase-difference detection operation by the plurality of phase-difference pixels.

15. A lowpass filter control apparatus, comprising:
a lowpass filter controller configured to:
control lowpass characteristics of a variable lowpass filter, wherein
the variable lowpass filter is in an optical path of light that enters an imaging element,
the imaging element includes a plurality of phase-difference pixels and a plurality of normal pixels, and
the lowpass characteristics for an exposure period of the plurality of normal pixels is different from the lowpass characteristics for an exposure period of the plurality of phase-difference pixels;
set a first cut frequency of the variable lowpass filter in an operation by a manual focus mode of an imaging device; and
set a second cut frequency of the variable lowpass filter in an operation by an autofocus mode of the imaging device, wherein the first cut frequency is higher than the second cut frequency.

\* \* \* \* \*